(12) United States Patent
Okazaki (10) Patent No.: US 7,625,308 B2
(45) Date of Patent: Dec. 1, 2009

(54) DIFFERENTIAL GEARS

(75) Inventor: Masaharu Okazaki, Okayama (JP)

(73) Assignee: OS Giken Co., Ltd., Okayama-shi (JP)

( * ) Notice: Subject to any disclaimer, the term of this patent is extended or adjusted under 35 U.S.C. 154(b) by 386 days.

(21) Appl. No.: 11/637,881

(22) Filed: Dec. 13, 2006

(65) Prior Publication Data

US 2007/0135254 A1 Jun. 14, 2007

(30) Foreign Application Priority Data

Dec. 14, 2005 (JP) .............................. 2005-359788

(51) Int. Cl.
*F16H 48/22* (2006.01)
*F16H 57/04* (2006.01)
(52) U.S. Cl. .................................... 475/160; 192/70.12
(58) Field of Classification Search .................. 475/160
See application file for complete search history.

(56) References Cited

U.S. PATENT DOCUMENTS 3,495,298 A * 2/1970 Engle et al. ................. 184/6.13
5,669,474 A * 9/1997 Dehrmann et al. ......... 192/3.29

* cited by examiner

*Primary Examiner*—Sherry L Estremsky
*Assistant Examiner*—Edwin A. Young
(74) *Attorney, Agent, or Firm*—Kratz, Quintos & Hanson, LLP (57) ABSTRACT

The invention provides a differential gear which can effectively prevent a drag noise of a clutch plate by a simple structure. In a differential gear (10) provided with a clutch means (16) having an inner pawl clutch plate (12) integrally rotating with a side gear (11), and an outer pawl clutch plate (14) integrally rotating with a differential case (13), a main communication path (41) and a radial communication path (44) communicating a bottom of the side gear (11) with a fitted portion (17) between the side gear (11) and the clutch plates (12, 14) is formed in the side gear (11), as a lubricating oil supplying means (40) for supplying a lubricating oil within the differential case (13) to a portion between sliding surfaces of both the clutch plates (12, 14) from the fitted portion (17) between the side gear (11) and the clutch plates (12, 14).

21 Claims, 8 Drawing Sheets

DIFFERENTIAL GEARS

BACKGROUND OF THE INVENTION

1. Technical Field

The present invention relates to a differential gear provided with a clutch means for differential limiting.

2. Background Art

As a differential gear of a motor vehicle, there is widely employed a limited slip differential having a differential limiting function making it possible to transmit a sufficient rotating force to the other wheel via a clutch means at a time when only one wheel is going to run idle. The limited slip differential is employed for preventing the rotating force from being unable to be transmitted to the other wheel on the basis of the idle running of the wheel, for example, in the case that one wheel runs on an ice, a snow or a mud, and for preventing a fishtail phenomenon of a vehicle body at a time of turning, a sudden acceleration or the like.

Figure 8:
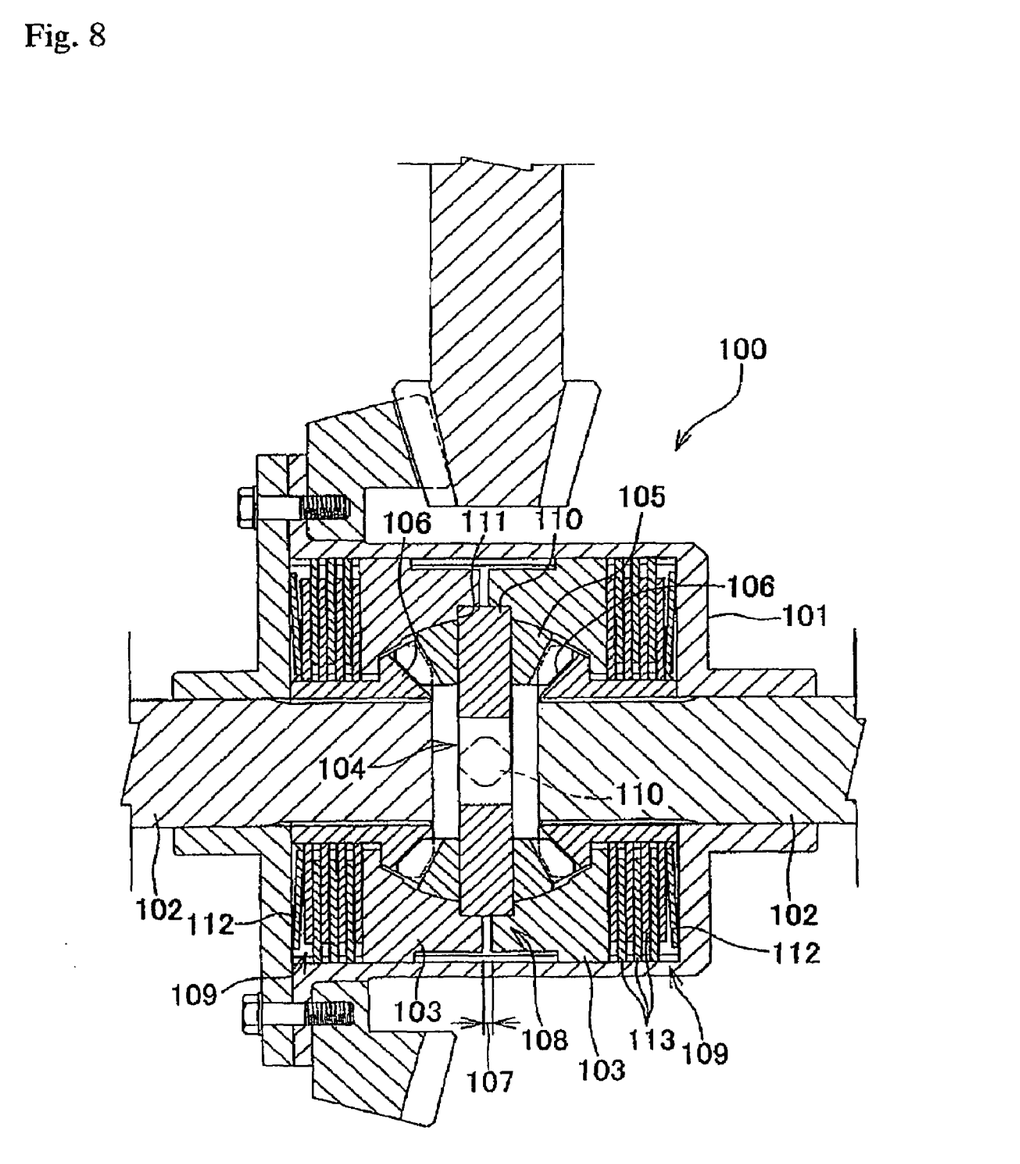
FIG. 8 is a horizontal cross sectional view of a differential gear in accordance with a prior art.

For example, a differential gear 100 shown in FIG. 8 is described in patent documents 1 and 2. The differential gear 100 is provided with a pair of pressure rings 103 arranged within a differential case 101 so as to be movable in a direction of axles 102 and be relatively non-rotatable, a pinion shaft 104 arranged so as to be orthogonal to the axles 102 in a state in which a shaft end is held between the pressure rings 103, a pinion gear 105 rotatably provided in the pinion shaft 104, a pair of side gears 106 respectively arranged in shaft ends of the right and left axles 102 so as to be non-rotatable and engaging with the pinion gear 105 in both sides while holding the pinion gear 105 therebetween, an operating means 108 operating the pressure rings 103 in a such a direction that a clearance 107 between the pressure rings 103 is enlarged in correspondence to an increase of a relative rotating torque between the pinion shaft 104 and the differential case 101 at a time of the differential, and clutch means 109 arranged in both sides in an axle direction of a pair of pressure rings 103 and operated by the pressure ring 103 so as to limit the differential of the right and left axles 102 in accordance with an enlargement of the clearance 107.

As the operating means 108, there have been proposed the operating means 108 having various shapes, however, there is employed, for example, a structure in which a quadrangular cam portion 110 having one diagonal line set in an axle direction is formed in a shaft end of the pinion shaft 104, and an approximately V-shaped cam groove 111 engaging with a cam portion 110 is formed in the pressure ring 103.

Further, in this differential gear 100, since the relative rotating torque is generated between the pinion shaft 104 and the differential case 101, and the clearance 107 between the pressure rings 103 becomes wider by the operating means 108, the clutch means 109 is actuated so as to limit the differential of the right and left wheels. However, the structure is made such that an elastic member 112 such as a disc spring or the like is arranged in an outer side in the axle direction of both the clutch means 109 in such a manner that the clearance 107 of both the pressure ring 103 is restored to the set interval at a normal time, thereby energizing the pressure rings 103 in a direction of coming close to each other via a plurality of clutch plates 113 of the clutch means 109.

However, since the elastic member 112 of the differential gear 100 energizes the pressure rings 103 in the direction of coming close to each other via the clutch plate 113, the clutch means 109 tends to be operated by the operating means 108 in the case of setting the energizing force to be weak, so that the differential limiting state is formed even at a low speed turning time and the differential state is not stabilized. Further, if the energizing force is made stronger, the operating means 108 comes to a differentiable state, however, since the clutch plate 113 is always frictionally pressure contacted by the energizing force of the elastic member 112 so as to be substantially in a differential limiting state, it is impossible to stably secure the differential state at a low speed turning time. In other words, it is impossible to have a small turning circle at the low speed turning time, and there is generated a so-called chattering phenomenon in which the differential limiting state and the differential state are alternately switched. Accordingly, there are problems that a steering performance is lowered, and the differential gear 100 and there peripheral devices thereof are adversely affected by an impact at a time of the chattering.

Accordingly, in the patent document 3 the applicant of the present invention has proposed a differential gear structured such that an energizing means for energizing both pressure rings in a direction of coming close to each other is provided via no clutch plate, whereby the differential state and the differential limiting state are properly switched, and has put it to a practical use.

Patent Document 1: Japanese Examined Patent Publication No. 55-27980

Patent Document 2: Japanese Unexamined Patent Publication No. 58-221049

Patent Document 3: Japanese Unexamined Patent Publication No. 2001-289305

SUMMARY OF THE INVENTION

Problems to be Solved by the Invention

In this case, in the invention described in the patent documents 1 and 2, since the clutch plate always comes to the slidable contact state by the elastic member, there is a problem that a drag noise is generated due to a sliding motion of the clutch plates at a time when a differential state is generated within an initial torque, in addition to the problems mentioned above.

Further, in the invention described in the patent document 3, since the pressure ring is energized in the direction of coming close to each other via no clutch plate, the problem of the drag noise can be widely improved in comparison with the differential gear described in the patent documents 1 and 2. However, since the clearance between the clutch plates is reduced, and the clutch plate is energized by the elastic member in such a manner that the switching between the differential state and the differential limiting state can be smoothly executed, there is left a problem that a slight drag noise is generated.

An object of the present invention is to provide a differential gear which can effectively prevent a drag noise of a clutch plate by a simple structure.

Means to Solve the Problems

The applicant of the present invention has found that the drag noise due to the sliding between the clutch plates is generated on the basis of a lack of a lubricating oil on the sliding surfaces of the clutch plates, and has completed the present invention after conducting an extensive study of a structure supplying the lubricating oil to a portion between the sliding surfaces of the clutch plates by the simple structure.

In accordance with the present invention, there is provided a differential gear comprising:

a clutch means having an inner pawl clutch plate integrally rotating with a side gear, and an outer pawl clutch plate integrally rotating with a differential case, wherein the differential gear is provided with a lubricating oil supplying means for supplying a lubricating oil within the differential case to a portion between sliding surfaces of both the clutch plates from a fitted portion between the side gear and the clutch plate.

In accordance with this differential gear, the lubricating oil within the differential case is supplied to the portion between the sliding surfaces of both the clutch plates from the fitted portion between the side gear and the clutch plate, by the lubricating oil supplying means, whereby the sliding surface is lubricated, and it is possible to effectively prevent the drag noise in the sliding surfaces of the clutch plates from being generated.

In this case, as a first aspect of the lubricating oil supplying means, a communication path communicating a bottom of the side gear with the fitted portion between the side gear and the clutch plate can be formed in the side gear. In the lubricating oil supplying means in accordance with the first aspect, the lubricating oil within the differential case bitten into the mating portion between the side gear and the pinion gear is pressure fed to the fitted portion between the side gear and the clutch plate through the communication path open to the bottom of the side gear, on the basis of a pumping operation in the mating portion, and is supplied to the portion between the sliding surfaces of both the clutch plates from the fitted portion, whereby the sliding surface is lubricated and it is possible to effectively prevent the drag noise from being generated in the sliding surface of the clutch plate.

Further, in the lubricating oil supplying means in accordance with the first aspect, the structure can be made such that an oil reservoir portion is formed in the fitted portion between the side gear and the clutch plate, and the communication path is open to the oil reservoir portion. In this case, it is possible to uniformly supply the lubricating oil to a plurality of portions between the sliding surfaces from the oil reservoir portion. Further, since the lubricating oil in the oil reservoir portion is going to move to an outer side in a radial direction on the basis of a centrifugal force generated by a rotation of the side gear, it is possible to further efficiently pressure feed the lubricating oil to the portion between both the clutch plates.

In the lubricating oil supplying means in accordance with the first aspect, the structure can be made such that the oil reservoir portion is open to an inner side of the differential case in the end portion in an opposite side to the gear portion of the side gear. As the differential gear, there is widely employed the differential gear in which the opposite side to the gear portion of the side gear is brought into slidable contact with the differential case. In the differential gear having the structure mentioned above, if the oil reservoir portion is open to the inner side of the differential case in the end portion in the opposite side to the gear portion of the side gear, it is possible to supply the lubricating oil to the slidable contact portion between the side gear and the differential case, and it is preferably possible to prevent a seizure in the slidable contact portion.

As a second aspect of the lubricating oil supplying means, the structure can be made such that the oil reservoir portion is formed in the fitted portion between the side gear and the clutch plate, and an end portion of the oil reservoir portion is open to the inner side of the differential case in the opposite side to the gear portion of the side gear. In the lubricating oil supplying means in accordance with the second embodiment, the lubricating oil within the differential case flowing into the oil reservoir portion formed in the fitted portion between the side gear and the clutch plate is rotated together with the side gear and is pressure fed to the portion between the sliding surfaces of both the clutch plates from the oil reservoir portion on the basis of the centrifugal force, whereby the sliding surface is lubricated and it is possible to effectively prevent the drag noise from being generated in the sliding surfaces of the clutch plates.

In the lubricating oil supplying portion in accordance with the first and second aspects, the oil reservoir portion can be formed by omitting a part of the engagement portion in at least one of the side gear and the inner pawl clutch plate.

As an aspect of the clutch plate in the differential gear, the structure can be made such that an oil supply groove supplying the lubricating oil supplied to the fitted portion between the side gear and the clutch plate to a portion between the sliding surfaces of both the clutch plates is formed in at least one of the inner pawl clutch plate and the outer pawl clutch plate. It is possible to smoothly supply the lubricating oil supplied to the fitted portions to the portion between the sliding surfaces of both the clutch plates, by forming the oil supply groove mentioned above.

In accordance with a preferable aspect, an annular oil groove communicating with the oil supply groove is formed in the sliding surface of at least one of the inner pawl clutch plate and the outer pawl clutch plate, in the clutch plates in accordance with the aspect mentioned above. In accordance with this structure, it is possible to uniformly lubricate an entire periphery of the sliding surface by the lubricating oil supplied to the annular oil groove from the oil supply groove, and it is possible to further reduce the drag noise of the clutch plate. It is preferable that the oil supply groove and the annular oil groove are arranged in such a manner that the lubricating oil is supplied to the portion between the respective sliding surfaces of the adjacent clutch plates. Further, the oil supply groove and the annular oil groove can be formed in both surfaces of one or both of the inner pawl clutch plate and the outer pawl clutch plate, however, it is preferable that the oil supply groove and the annular oil groove are formed in one surface of the inner pawl clutch plate and the outer pawl clutch plate so as to reduce a deterioration of the strength of the clutch plate as small as possible, and both the clutch plates are assembled in such a manner that the oil supply groove and the annular oil groove are arranged in each of the sliding surfaces.

In the clutch plate in accordance with the aspect mentioned above, in accordance with a preferable aspect, an oil reservoir hole reserving the lubricating oil supplied from the oil supply groove is formed in the sliding surface of at least one of the inner pawl clutch plate and the outer pawl clutch plate. In this case, since it is possible to reserve the surplus lubricating oil in the oil reservoir hole at a time when the lubricating oil in the sliding surface is sufficient, and it is possible to supply the lubricating oil to a portion between the sliding surface from the oil reservoir hole at a time when the lubricating oil comes short, it is possible to reduce a periodical fluctuation of the lubricating oil. Further, since it is possible to supply the lubricating oil to the sliding surface facing to the opening portion of the oil reservoir hole in a surface manner, it is possible to supply the lubricating oil entirely to the sliding surface, by setting an opening area of the oil reservoir hole large. Particularly, if the oil reservoir hole is formed in both of the inner pawl clutch plate and the outer pawl clutch plate, the lubricating oil can enter and leave between the oil reservoir holes in both the clutch plates, and it is preferably possible to uniformly lubricate a plurality of sliding surfaces.

In accordance with a preferable aspect, a plurality of the oil reservoir holes are formed at a set interval in a peripheral direction of the clutch plate, and a radial direction position of the clutch plate is changed in the adjacent oil reservoir holes. In accordance with the structure mentioned above, it is possible to supply the lubricating oil to an entire of the sliding surface while preventing the deterioration of the strength and the rigidity of the clutch plate by making the opening area of the oil reservoir hole small.

EFFECT OF THE INVENTION

Since the differential gear in accordance with the present invention can supply the lubricating oil to the portion between both the clutch plates from the fitted portion between the side gear and the clutch plate, by utilizing the pumping operation in the mating portion between the side gear and the pinion gear, the centrifugal force generated by the rotation of the side gear, or the like, it is possible to pressure feed the lubricating oil to the portion between both the clutch plates without increasing the number of the parts or making the structure of the differential gear complicated, and it is possible to effectively prevent the drag noise of the clutch plate from being generated at a time of operating within the initial torque.

DETAILED DESCRIPTION OF THE INVENTION

A description will be given below of an embodiment in accordance with the present invention with reference to the accompanying drawings.

As shown in FIGS. 1 to 4, a differential gear 10 corresponds to the differential gear 10 provided with a clutch means 16 having an inner pawl clutch plate 12 integrally rotating with a side gear 11, and an outer pawl clutch plate 14 integrally rotating with a differential case 13, and the differential gear 10 is provided with a lubricating oil supplying means 40 for supplying a lubricating oil within the differential case 13 to a portion between sliding surfaces 12a and 14a of both the clutch plates 12 and 14 from fitted portions 17 between the side gear 11 and the clutch plates 12 and 14. In this case, the present invention can be applied to any differential gear having an optional structure, as far as the differential gear is provided with a pinion gear 15 and a side gear 11 for differential, and a clutch means 16 for differential limiting.

Figure 1:
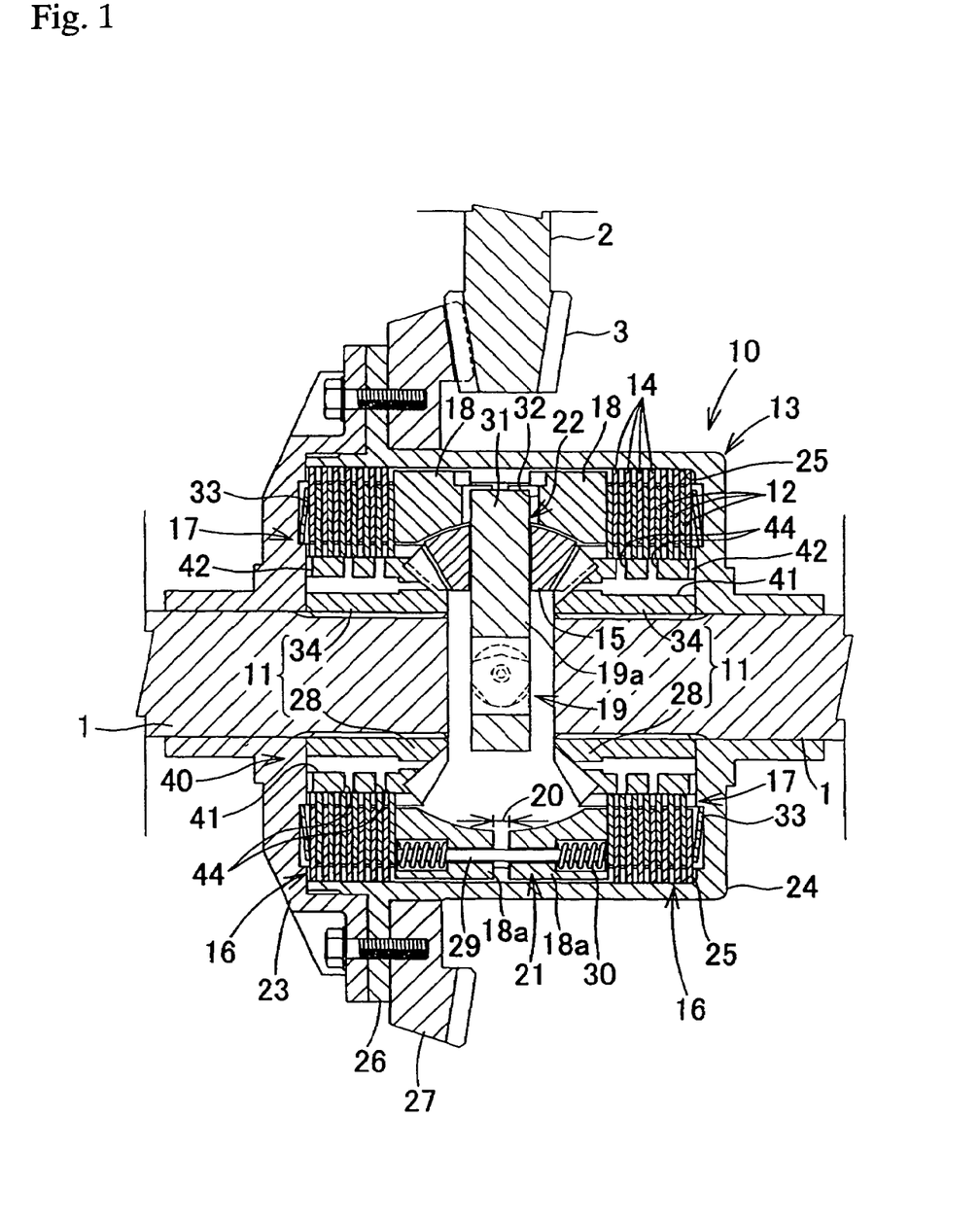
FIG. 1 is a horizontal cross sectional view of a differential gear.

The differential gear 10 is provided with the differential case 13 rotated around right and left axles 1 on the basis of a driving force applied from an engine, a pair of right and left side gears 11 respectively provided in shaft ends of the right and left axles 1 within the differential case 13 so as to be relatively non-rotatable, a pair of right and left pressure rings 18 arranged in the right and left side gears 11 so as to be outside fitted at a slight gap and rotating integrally with the differential case 13, a pinion shaft 19 provided orthogonally to the axles 1 while holding the shaft ends between the right and left pressure rings 18, a pinion gear 15 provided rotatably in a shaft portion 19a of the pinion shaft 19 and engaging with the right and left side gears 11, a set of clutch means 16 provided between a side wall portion of the differential case 13 and the side gear 11 in both sides of both the pressure rings 18 in an axle direction, and having the inner pawl clutch plate 12 and the outer pawl clutch plate 14 alternately arranged along the axle direction, an energizing means 21 for energizing both the pressure rings 18 in a direction in which a clearance 20 between both the pressure rings 18 becomes narrower, an operating means 22 for operating the pressure rings 18 against the energizing force of the energizing means 21 in a direction in which the clearance 20 between both the pressure rings 18 is increased in correspondence to an increase of a relative rotating torque between the pinion shaft 19 and the differential case 13 at a time of differential so as to actuate the clutch means 16, and a lubricating oil supplying means 40 for supplying the lubricating oil within the differential case 13 to the portion between the sliding surfaces 12a and 14a of both the clutch plates 12 and 14.

The differential case 13 is structured such as to be divided into a lid member 23 and a case main body 24, a plurality of races 25 extending in the axial direction are formed over an entire length of an inner peripheral surface of the case main body 24 at a predetermined interval in a peripheral direction, and the lid member 23 is fixed to a flange portion 26 formed in a left end portion of the case main body 24. A ring gear 27 is fixed to the flange portion 26, and the ring gear 27 is engaged with the drive pinion 3 provided in the drive shaft 2 of the engine. Shaft ends of the right and left axles 1 are coaxially inserted to the differential case 13 so as to pass through the lid member 23 and a right wall of the case main body 24, and the differential case 13 is structured such as to rotate around the axle 1 by a driving force applied from the engine via the drive pinion 3 and the ring gear 27.

The side gears 11 are provided in the shaft ends of the right and left axles 1 within the differential case 13 so as to be relatively non-rotatable, a pair of right and left pressure rings 18 are provided in gear portions 28 of the right and left side gears 11 at a slight gap in an outside fitted manner, an outer pawl portion 18a engaging with the race 25 of the case main body 24 is formed in an outer peripheral portion of both the pressure rings 18, and the pressure ring 18 is assembled so as to be movable in the axle direction and relatively non-rotatable with respect to the case main body 24.

A cross-shaped pinion shaft 19 having four shaft portions 19a extending orthogonal to the axle 1 is provided between the side gears 11, and four pinion gears 15 mating with the right and left side gears 11 are rotatably provided in the middle of the respective shaft portions 19a. The number of the pinion gears 15 can be optionally set, however, at least a pair of pinion gears are provided.

Figure 6:
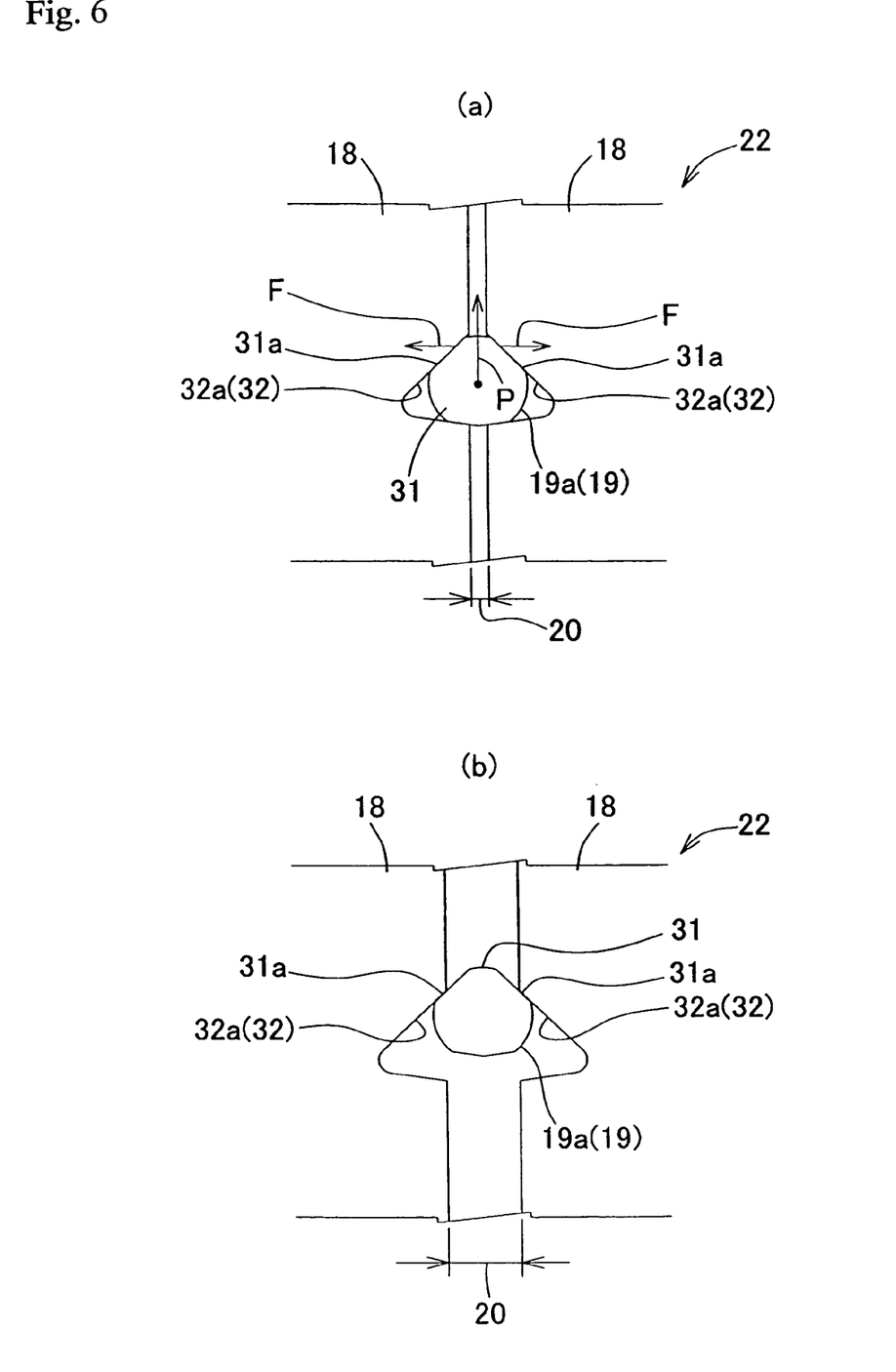
FIGS. 6A and 6B are explanatory views of an operation of an operating means.

As shown in FIGS. 1 and 6, the right and left pressure rings 18 are always energized in a direction coming close to each other by an energizing means 21 constituted by a rod member 29 and a compression coil spring 30. A cam portion 31 is formed in an outer end portion of the shaft portion 19a of the pinion shaft 19, a cam groove 32 holding the cam portion 31 from both sides is formed in facing surfaces in an outer peripheral portion of the pressure ring 18, and an operating means 22 is structured by the cam portion 31 and the cam groove 32. The pinion shaft 19 is structured such that the cam portion 31 is held to the cam grooves 32 of the right and left pressure rings 18, whereby the pinion shaft 19 is integrally rotated with the differential case 13 and the pressure ring 18. In this case, the shapes of the cam portion 31 and the cam groove 32 of the operating means 22 can employ a well-known shape in addition to the illustrated shapes. Further, the energizing means 21 can employ any structure as far as it can energize the pressure ring 18 in the direction coming close to each other. Reference numeral 33 denotes a disc spring provided for the purpose of doing away with a play between the clutch plates 12 and 14. The disc spring 33 may be omitted in the case that the clutch means 16 can be assembled approximately with no play.

Figure 2:
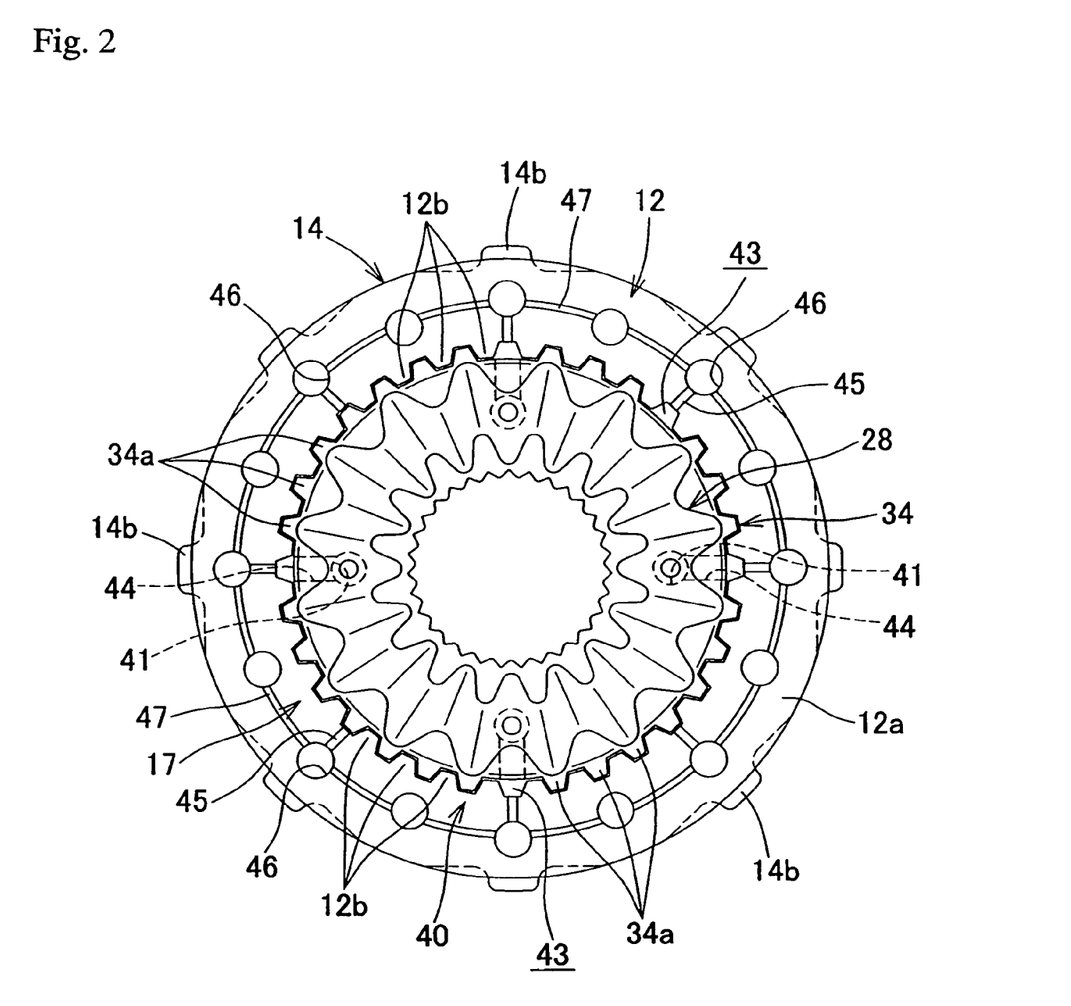
FIG. 2 is a right side elevational view of a left side gear and an inner pawl clutch plate assembled therein.
Figure 3:
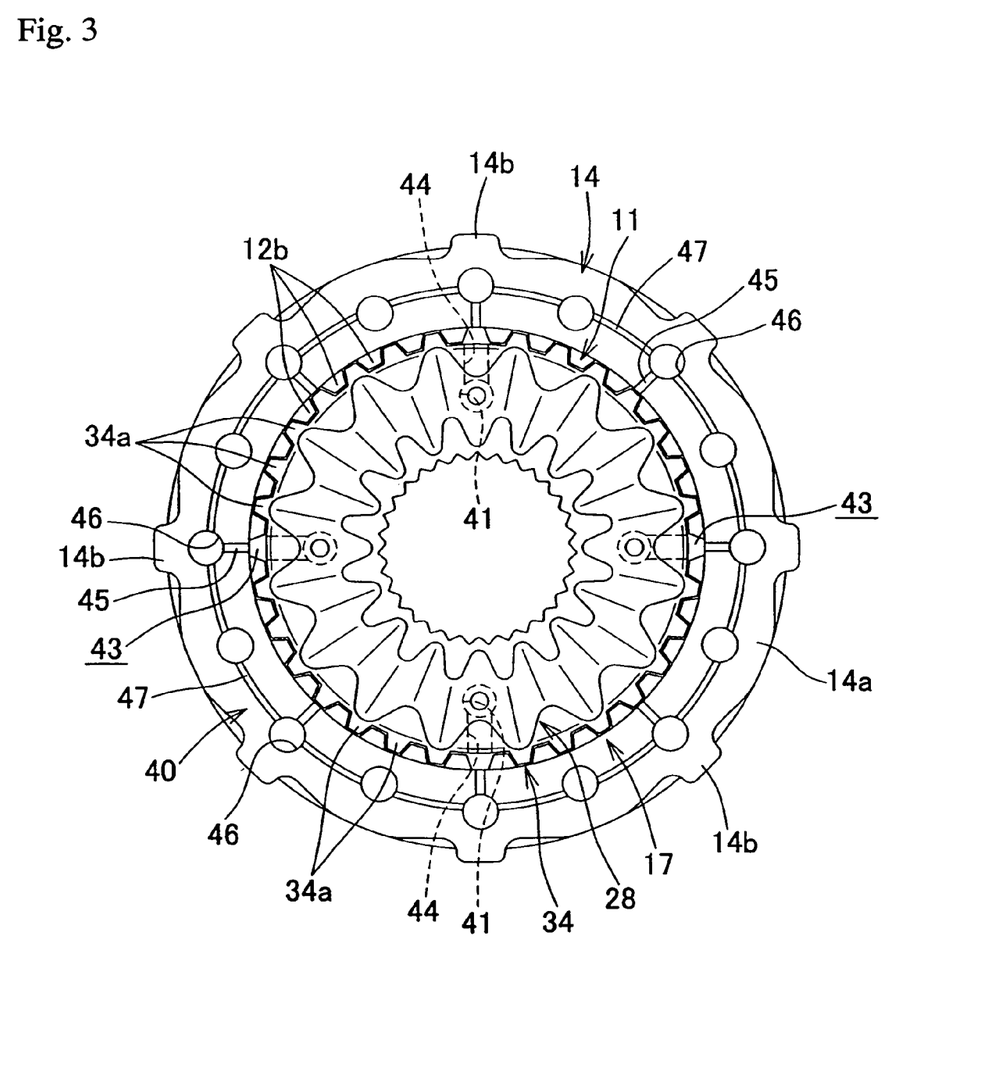
FIG. 3 a right side elevational view of the left side gear and an outer pawl clutch plate assembled therein.
Figure 4:
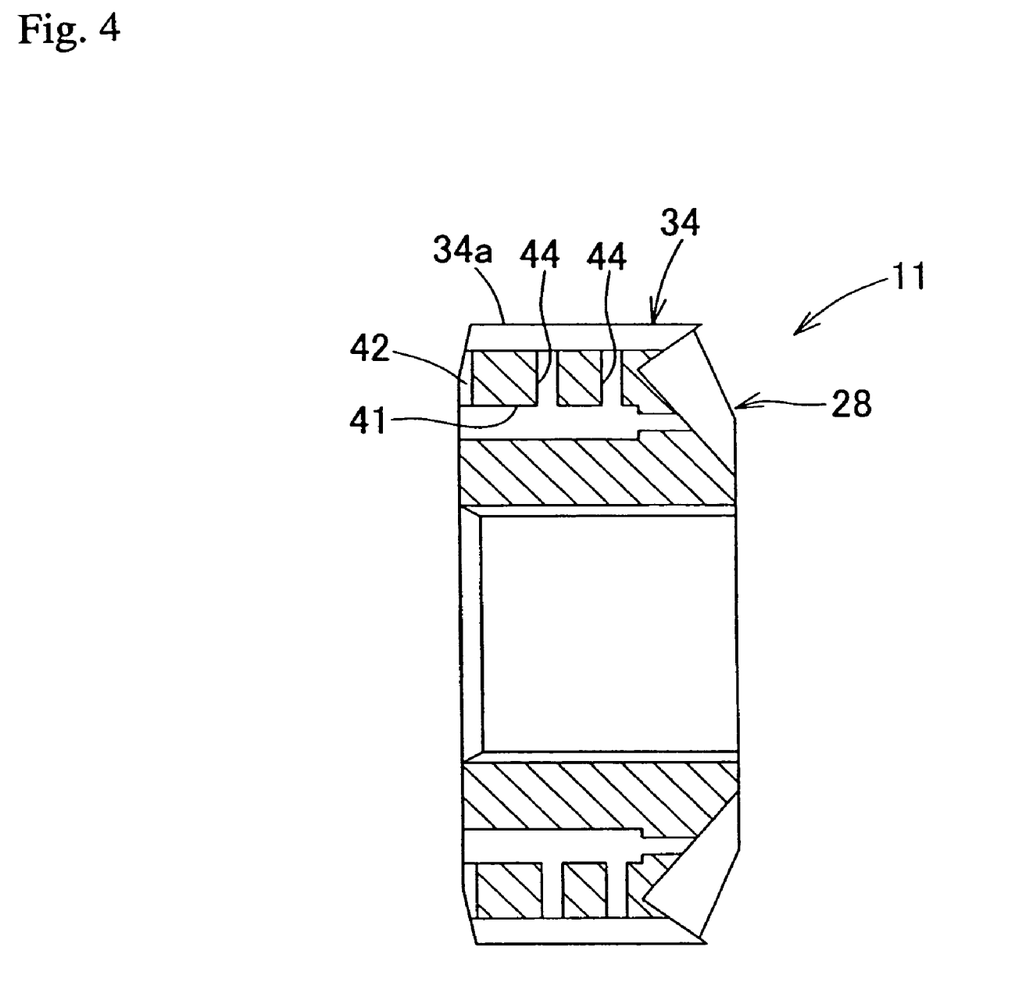
FIG. 4 is a vertical cross sectional view of the left side gear.
Figure 5:
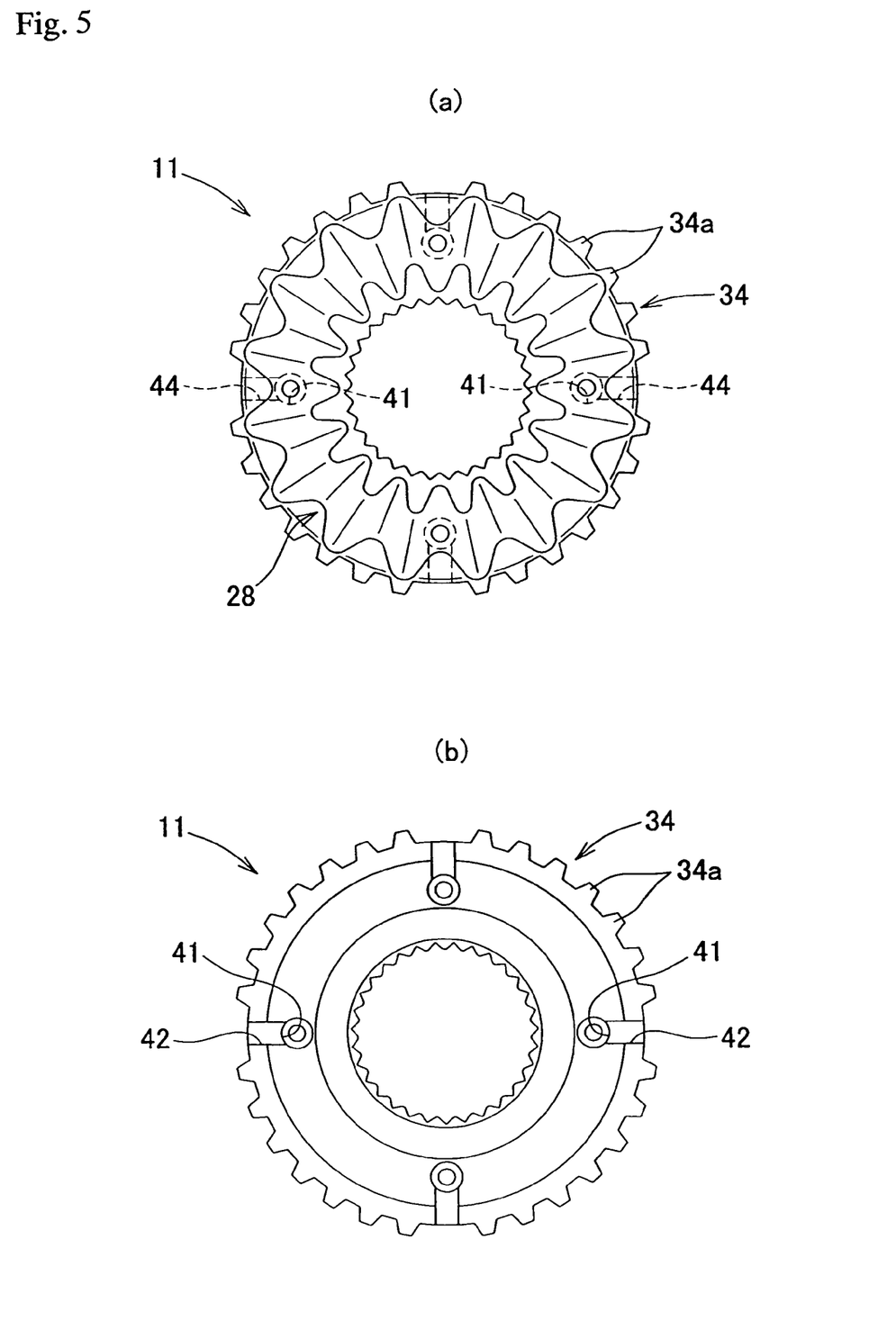
FIG. 5A is a right side elevational view of the left side gear.
FIG. 5B is a left side elevational view of the left side gear.

As shown in FIGS. 1 to 3, the clutch means 16 is provided between the side wall portion of the differential case 13 and the side gear 11 in both sides of both the pressure rings 18 in the axle direction, and is provided with the inner pawl clutch plate 12 and the outer pawl clutch plate 14 which are alternately arranged along the axle direction. An outer pawl portion 14b engaging with the race 25 of the differential case 13 is formed in an outer peripheral portion of the outer pawl clutch plate 14 so as to protrude to an outer side, and the outer pawl clutch plate 14 is assembled so as to be movable in the axle direction and be relatively non-rotatable with respect to the differential case 13. A spline shaft portion 34 is formed over an entire length in an outer peripheral portion of the side gear 11, an inner pawl portion 12b fitted to the spline shaft portion 34 is formed in an inner peripheral portion of the inner pawl clutch plate 12 so as to protrude to an inner side, and the inner pawl clutch plate 12 is assembled so as to be movable in the axle direction and be relatively non-rotatable with respect to the side gear 11.

In this differential gear 10, when the drive shaft 2 of the engine is rotated, the pressure ring 18 and the pinion shaft 19 are rotated together with the differential case 13 via the drive pinion 3 and the ring gear 27, as shown in FIG. 1. Further, in the case that rotational resistances of the right and left wheels are identical, the pinion gear 15 is rotated only around the axle together with the side gear 11 without being rotated around the shaft portion 19a, and the right and left wheels are rotated at the same speed. If the rotational resistance of one wheel is reduced, the pinion gear 15 revolves around the axle while engaging with the side gear 11 by a part of the rotating force applied to the differential case 13, and there is generated a differential state in which the rotating speed of the wheel having the less rotational resistance becomes higher than that of the wheel having the larger rotational resistance. However, at a time of a high speed and a high load, the cam portion 31 and the cam groove 32 of the operating means 22 are relatively rotated at a little, whereby the clearance 20 between the right and left pressure rings 18 is adjusted against the energizing force of the energizing means 21, there is generated a differential limiting state in which the relative rotation between the side gear 11 and the differential case 13 is limited by the frictional pressure contact force between the clutch plates 12 and 14 of the clutch means 16, and a steering performance at a time of the high speed and high load is secured while improving the turning performance at a time of a low speed.

More specifically, in the case that a difference of rotational resistance is generated in the right and left wheels at a time of traveling forward, a relative rotational torque P is generated between the pinion shaft 19 and the differential case 13, as shown in FIG. 6A. An operating force F in a direction of moving both the pressure rings 18 away from each other is applied to both the pressure rings 18 via an operating surface 31a of the cam portion 31 and an inclined cam surface 32a of the cam groove 32, on the basis of the relative rotational torque P. As shown in FIG. 6B, a contact position between the operating surface 31a of the cam portion 31 and the inclined cam surface 32a of the cam groove 32 is deviated in such a manner that the pinion shaft 19 and the differential case 13 are going to relatively rotate at a small amount, whereby the clearance 20 is going to be increased. On the other hand, the energizing force for moving both the pressure rings 18 close to each other is always applied to both the pressure rings 18 by the energizing means 21. Accordingly, when the operating force F of the operating means 22 is smaller than the energizing force of the energizing means 21, the smallest clearance 20 can be maintained so as to generate the differential state, as shown in FIG. 6A, and if the operating force F becomes larger than the energizing force, the clearance 20 becomes larger in correspondence to the difference of force, the clutch plates 12 and 14 are pressed in the side surfaces of both the pressure rings 18, and the clutch plates 12 and 14 are pressure contacted by friction with each other so as to generate the differential limiting state, as shown in FIG. 6B.

The present invention is provided for preventing the drag noise from being generated by the sliding between the clutch plates 12 and 14 in the case that the differential state is generated within the initial torque, in the differential gear 10 mentioned above. The differential gear 10 is provided with the lubricating oil supplying means 40 for forcibly supplying the lubricating oil within the differential case 13 from the fitted portions 17 between the side gear 11 and the clutch plates 12 and 14 to the portion between the sliding surfaces 12a and 14a of both the clutch plates 12 and 14.

A description will be given of the lubricating oil supplying means 40. As shown in FIGS. 1 to 5, four main communication paths 41 extending in an axial direction are formed in the middle portion of the side gear 11 in a radial direction so as to be spaced at a fixed interval in a circumferential direction, one end portion of the main communication path 41 is open toward a side wall side of the differential case 13, and the other end portion is open to a bottom of the gear portion 28 of the side gear 11. A guide groove 42 extending in a radial direction is formed in an end portion of the side wall side of the differential case 13 in the side gear 11, and an inner peripheral side end portion of the guide groove 42 is communicated with one end portion of the main communication path 41. The number of the main communication path 41 can be optionally set. Further, one end portion in the side wall side of the differential case 13 in the main communication path 41 can be closed in such a manner as to prevent a pressure within the main communication path 41 is not lowered.

A number of spline gear teeth 34a of the spline shaft portion 34 is set to even number times of the number of teeth of the side gear 11, the spline gear teeth 34a at a peripheral position corresponding to the main communication path 41 and in at least the outside fitted region of the clutch plates 12 and 14 have lack portions in an entire portion or an outer end portion in a radial direction, and an oil reservoir portion 43 extending in an axial direction is formed between the lack portions of the spline gear teeth 34a and the inner pawl clutch plate 12. A pair of radial communication paths 44 is formed in the outer peripheral portion of the side gear 11. In the radial communication path 44, one end portion is open to the middle portion of the main communication path 41, and the other end portion is open to the oil reservoir portion 43.

In this case, the number of the radial communication paths 44 can be optionally set with respect to one main communication path 41. Further, a slit-shaped radial communication path extending in an axial direction or a peripheral direction can be formed in place of the radial communication path 44 formed in a through hole. The main communication path 41 and the radial communication path 44 correspond to the communication path. It is preferable that the oil reservoir portion 43 is provided for uniformly supplying the lubricating oil to the sliding surfaces 12a and 14a of a plurality of clutch plates 12 and 14, however, may be omitted. Further, the oil reservoir portion 43 is formed by lacking the spline gear teeth 34a, however, the oil reservoir portion 43 can be formed by lacking an entire portion or an inner peripheral portion of the inner pawl portion 12b of the inner pawl clutch plate 12 corresponding to the main communication path 41. Further, the oil reservoir portion 43 can be formed by forming the spline groove of the spline shaft portion 34 corresponding to the main communication path 41 deeper than the other groove. Further, in order to open the radial communication path 44 to the oil reservoir portion 43 formed by lacking the spline gear teeth 34a, the number of the spline gear teeth 34a is set to the even number times of the teeth number of the side gear 11, however, in the case that the oil reservoir portion is formed by lacking the inner pawl portion 12b, the number of the spline gear teeth 34a is set to odd number times of the teeth number of the side gear 11. In this case, the structure in which the number of the spline gear teeth 34a is set independently from the teeth number of the side gear 11 belongs to the category of the present invention.

A plurality of oil reservoir holes 46 are formed in the middle portions in the radial direction of the inner pawl clutch plate 12 and the outer pawl clutch plate 14 so as to be spaced at a set interval in a circumferential direction, these plurality of oil reservoir holes 46 are formed so as to be shifted in a radial direction from the adjacent oil reservoir hole 46, and is structured such that approximately an entire of the sliding surfaces 12a and 14a can be lubricated on the basis of the relative rotation between the inner pawl clutch plate 12 and the outer pawl clutch plate 14. Further, the oil reservoir holes 46 of the inner pawl clutch plate 12 and the outer pawl clutch plate 14 are formed at the same position, and are structured such that the lubricating oil within the oil reservoir hole 46 can enter and leave between both the clutch plates 12 and 14, and the lubricating oil reserved within the oil reservoir hole 46 is uniformly formed.

An oil supply groove 45 and an annular oil groove 47 are respectively formed in one sliding surface 12a of the inner pawl clutch plate 12 and one sliding surface 14a of the outer pawl clutch plate 14. The oil supply groove 45 is formed in the sliding surfaces 12a and 14a in a radial direction, an inner peripheral side end portion of the oil supply groove 45 is open to the oil reservoir portion 43, and an outer peripheral end portion of the oil supply groove 45 is communicated with the every other oil reservoir hole 46. The annular oil groove 47 is formed in the middle portion in the radial direction of the sliding surfaces 12a and 14a, and the adjacent oil reservoir hole 46 is communicated by the annular oil groove 47.

In this case, the numbers of the oil supply groove 45 and the oil reservoir hole 46 can be optionally set in correspondence to the number of the oil reservoir portion 43. Further, it is preferable that the adjacent oil reservoir holes 46 are structured such that the positions in the radial direction are different, however, they may be formed at the same radial direction position. The shape of the oil reservoir hole 46 is formed as a round hole, however, can be formed in an oval shape or a long hole shape elongated in the radial direction. The annular oil groove 47 can be constituted by a plurality of coaxial oil grooves, or may be formed in a wavy shape such as a sine wave or the like. The oil supply groove 45 and the annular oil groove 47 can be formed in both surfaces of one of the inner pawl clutch plate 12 and the outer pawl clutch plate 13, or can be formed in both surfaces of the both. Further, in the case that the lubricating oil can be sufficiently supplied to the sliding surfaces 12a and 14a of both the clutch plates 12 and 14, it is possible to omit one of the oil reservoir hole 46 and the annular oil groove 47, or it is possible to omit the oil supply groove 45, the reservoir hole 46 and the annular oil groove 47. Further, the structure can be made such that the oil supply groove 45 is properly arranged at the position corresponding to the oil reservoir portion 43 at a time of assembling the inner pawl clutch plate 12 with respect to the side gear 11, and the inner pawl clutch plate 12 can not be assembled in the side gear 11 only in the case that the oil supply groove 45 exists at the peripheral position corresponding to the oil reservoir portion 43, by setting the shape or the dimension of one spline gear teeth 34a different from the other spline gear teeth 34a.

A description will be given of an operation of the lubricating oil supplying means 40. The lubricating oil is filled in the differential case 13 to a height about one third of the differential case 13, and the structure is made such that the lower portion of the side gear 11 and approximately an entire of the pinion gear 15 revolving downward are dipped into the lubricating oil. Accordingly, the lubricating oil within the differential case bitten into the mating portion between the side gear 11 and the pinion gear 15 is pressure fed to the main communication path 41 from the mating portion between side gear 11 and the pinion gear 15 on the basis of the pumping operation caused by the engagement between both the gears 11 and 15, and is supplied to the oil reservoir portion 43 formed in the fitted portion 17 between the spline shat portion 34 of the side gear 11 and the clutch plates 12 and 14, through the radial communication path 44 from the main communication path 41 on the basis of the centrifugal force generated by the rotation of the side gear 11. Further, the lubricating oil in the oil reservoir portion 43 is pressure fed to the outer peripheral side from the oil reservoir portion 43 along the oil supply groove 45 on the basis of the centrifugal force of the clutch plates 12 and 14, and is supplied to the oil reservoir hole 46 and the annular oil groove 47 so as to lubricate the sliding surfaces 12a and 14a of the outer pawl clutch plate 14 and the inner pawl clutch plate 12. Accordingly, it is possible to prevent the drag noise of the clutch plates 12 and 14 from being generated in the differential within the initial torque. Further, the lubricating oil within the oil reservoir portion 43 is supplied to the portion between the side wall portions of the side gear 11 and the differential case 13 from the end portion in the side wall side of the differential case 13 in the main communication path 41 through the guide groove 42, and is supplied to the sliding portions of the side gear 11 and the differential case 13, whereby the seizure between the side gear 11 and the differential case 13 is prevented.

Further, in the differential gear 10 shown in FIG. 1, the structure is made such that the differential limiting function can be properly obtained by setting the inner diameter of the pressure ring 18 larger than the outer diameters of the gear portion 28 of the side gear 11 and the spline shaft portion 34, setting the outer diameters of the gear portion 28 and the spline shaft portion 34 approximately identical, and forming the spline shaft portion 34 in the outer peripheral portion of the side gear 11 over the entire length thereof, and forming the pressure ring 18 thinner in the axle direction so as to increase the numbers of the clutch plates 12 and 14 as much as possible. Accordingly, the spline shaft portion 34 of the side gear 11 is structured thicker than the conventional one, and the main communication path 41 and the radial communication path 44 can be formed by effectively utilizing the dead space of the spline shaft potion 34.

Further, in the differential gear 10, since both the pressure rings 18 are energized in the direction moving close to each other by the energizing means 21 via no clutch means 16, the switching timing from the differential state to the differential limiting state depends only on the operating force F of the operating means 22 and energizing force of energizing means 21. Accordingly, the structure is made such that differential state can be securely obtained at a time of the low speed rotation, and the differential limiting state can be securely obtained at a time of rotating at the high speed and the high load, by properly setting the energizing force of the energizing means 21. However, since the pressure contact between the clutch plates 12 and 14 is executed only by the disc sprig 33 provided for the purpose of doing away with the play, and the pressure contact is not achieved by the energizing means 21, the generation of the drag noise can be lowered by this structure.

In this case, the structure from which the main communication path 41 and the radial communication path 44 are omitted belongs to the category of the present invention. In this case, the lubricating oil within the differential case 13 enters into the oil reservoir portion 43 from the end portion in the side wall side of the differential case 13 in the oil reservoir portion 43, and the lubricating oil is pressure fed to the oil supply groove 45 on the basis of the centrifugal force of the side gear 11 and the clutch plates 12 and 14.

Further, the lubricating oil supplying means 40 in accordance with the present invention can be applied to the differential gear 100 in accordance with the background art shown in FIG. 8. In this case, the same reference numerals are attached to the same members as those of the differential gear 100 described in the background art, and a detailed description thereof will be omitted.

Figure 7:
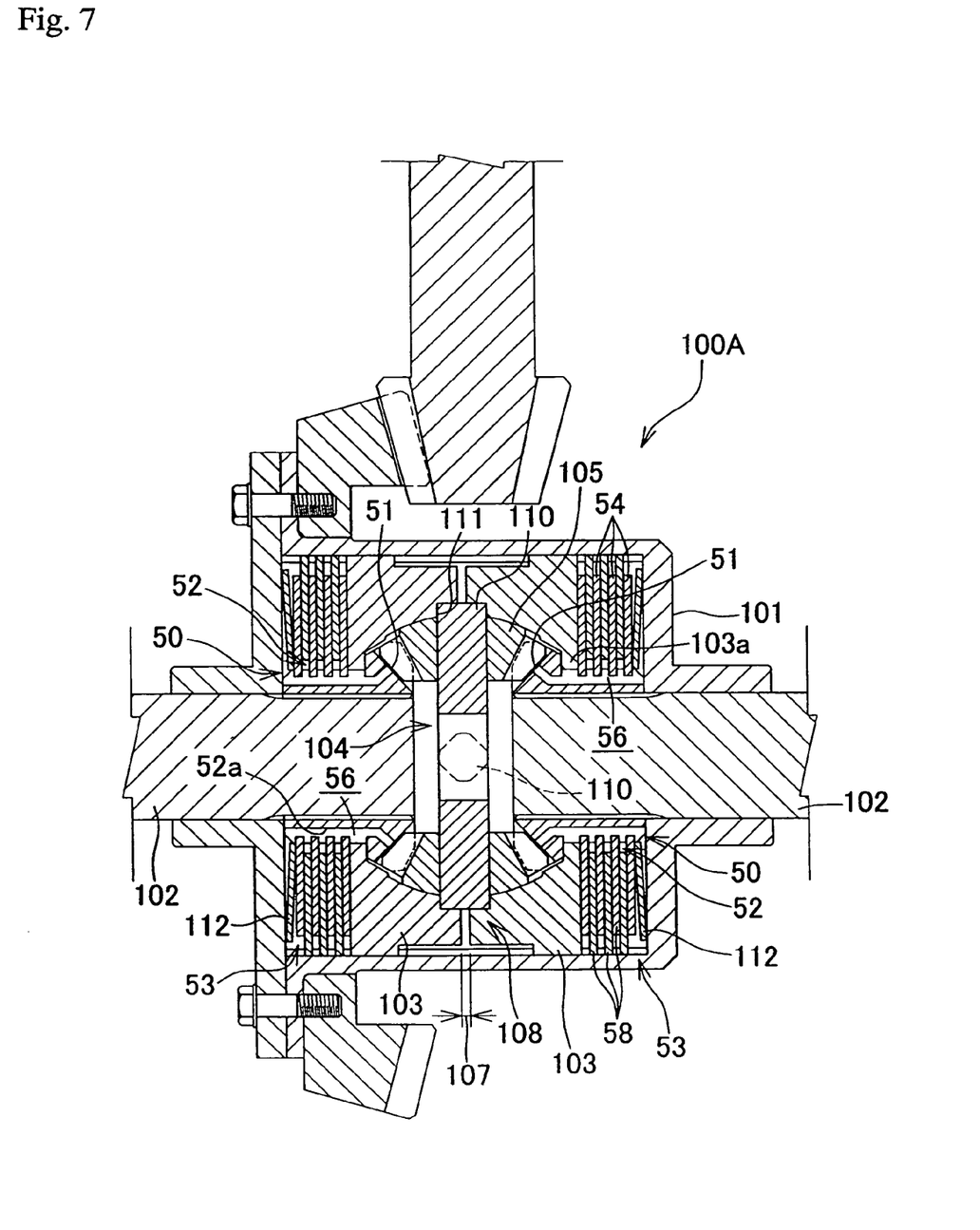
FIG. 7 is a view corresponding to FIG. 1 of a differential gear in accordance with the other structure.

As shown in FIG. 7, a description will be given of a lubricating oil supplying means 50 of a differential gear 100A. Oil reservoir portions 56 extending in an axial direction are formed in a fitted portion 55 between a spline shaft portion 52 of a side gear 51 and an inner pawl clutch plate 54 of a clutch means 53 at a fixed interval in a peripheral direction, one end of the oil reservoir portion 56 is open to an inner side of a differential case 101, and the other end portion is communicated with a through hole 57 open to a bottom of the side gear 51.

The oil reservoir portion 56 is formed by making one spline groove 52a of the spline shaft portion 52 deeper than the other groove. In this case, it may be formed by lacking an entire portion or an outer end portion in a radial direction of one spline tooth, or may be formed by lacking an entire portion or an inner peripheral portion of one row of pawl portions arranged in an axial direction of the inner pawl clutch plate 54.

The oil supply groove 45, the oil reservoir hole 46 and the annular oil groove 47 are formed in the inner pawl clutch plate 54 and the outer pawl clutch plate 58 in the same manner as the clutch plates 12 and 14 in accordance with the embodiment mentioned above, although an illustration is omitted.

In this lubricating oil supplying means 50, the lubricating oil is pressure fed to the oil reservoir portion 56 from a mating portion between the side gear 51 and a pinion gear 105 through the through hole 57 on the basis of a pumping operation at a time when the side gear 51 and the pinion gear 105 are engaged, the lubricating oil is supplied to a portion between the sliding surfaces of the clutch plates 54 and 58 via the oil supply groove 45, the oil reservoir hole 46 and the annular oil groove 47 in the same manner as the embodiment mentioned above, and the sliding surface is lubricated, whereby the drag noise of the clutch plates 54 and 58 is prevented from being generated in the differential within the initial torque.

What is claimed is:

1. A differential gear comprising:
a case, a pinion gear, and a side gear, said side gear including side gear teeth engaging pinion gear teeth of said pinion gear, said side gear engaging an inner pawl of a first clutch plate integrally rotating with the side gear, and engaging with an outer pawl of a second clutch plate integrally rotating with the case, and having a differential limiting function, wherein
said side gear is provided with communication paths of a lubricating oil, said communication paths comprising main communication paths and radial communication paths,
said main communication paths extending in an axial direction are formed in a middle portion of the side gear in a radial direction and first openings thereof are open to a bottom of the side gear teeth,
said radial communication paths extending in an outward direction of said side gear in a radial direction from said main communication paths are formed and second openings thereof are open to portions at which said side gear engages with an inner pawl of said first clutch plate,
the lubricating oil in the case is supplied into said main communication paths by pumping action in an engagement portion between said side gear and said pinion gear, and the lubricating oil in said main communication paths is supplied to the clutch plate from said radial communication paths by centrifugal force generated by a rotation of said side gear.

2. The differential gear as claimed in claim 1, wherein an oil reservoir portion is formed in the fitted portion between the side gear and the clutch plate, and the second opening of the radial communication path is open to the oil reservoir portion.

3. The differential gear as claimed in claim 2, wherein the oil reservoir portion is open to an inner side of the case in the end portion in an opposite side to the side gear teeth.

4. The differential gear as claimed in claim 3, wherein the oil reservoir portion is formed by omitting a part of the engagement portion in at least one of said side gear and the first clutch plate.

5. The differential gear as claimed in claim 4, wherein an oil supply groove supplying the lubricating oil supplied to the fitted portion between the side gear and the clutch plate to a portion between the sliding surfaces of both the clutch plates is formed in at least one of said first clutch plate and the second clutch plate.

6. The differential gear as claimed in claim 3, wherein an oil supply groove supplying the lubricating oil supplied to the fitted portion between the side gear and the clutch plate to a portion between the sliding surfaces of both the clutch plates is formed in at least one of said first clutch plate and the second clutch plate.

7. The differential gear as claimed in claim 2, wherein the oil reservoir portion is formed by omitting a part of the engagement portion in at least one of said side gear and the first clutch plate.

8. The differential gear as claimed in claim 7, wherein an oil supply groove supplying the lubricating oil supplied to the fitted portion between the side gear and the clutch plate to a portion between the sliding surfaces of both the clutch plates is formed in at least one of said first clutch plate and the second clutch plate.

9. The differential gear as claimed in claim 2,
wherein an oil supply groove supplying the lubricating oil supplied to the fitted portion between the side gear and the clutch plate to a portion between the sliding surfaces of both the clutch plates is formed in at least one of said first clutch plate and the second clutch plate.

10. The differential gear as claimed in claim 1,
wherein the oil reservoir portion is formed in the fitted portion between the side gear and the clutch plate, and an end portion of the oil reservoir portion is open to the inner side of the case in the opposite side to the side gear teeth.

11. The differential gear as claimed in claim 10,
wherein the oil reservoir portion is formed by omitting a part of the engagement portion in at least one of said side gear and the first clutch plate.

12. The differential gear as claimed in claim 11,
wherein an oil supply groove supplying the lubricating oil supplied to the fitted portion between the side gear and the clutch plate to a portion between the sliding surfaces of both the clutch plates is formed in at least one of said first clutch plate and the second clutch plate.

13. The differential gear as claimed in claim 10,
wherein an oil supply groove supplying the lubricating oil supplied to the fitted portion between the side gear and the clutch plate to a portion between the sliding surfaces of both the clutch plates is formed in at least one of said first clutch plate and the second clutch plate.

14. The differential gear as claimed in claim 1,
wherein an oil supply groove supplying the lubricating oil supplied to the fitted portion between the side gear and the clutch plate to a portion between the sliding surfaces of both the clutch plates is formed in at least one of said first clutch plate and the second clutch plate.

15. The differential gear as claimed in claim 14,
wherein an annular oil groove communicating with the oil supply groove is formed in the sliding surface of at least one of said first clutch plate and the second clutch plate.

16. The differential gear as claimed in claim 15,
wherein an oil reservoir hole reserving the lubricating oil supplied from the oil supply groove is formed in the sliding surface of at least one of said first clutch plate and the second clutch plate.

17. The differential gear as claimed in claim 14,
wherein an oil reservoir hole reserving the lubricating oil supplied from the oil supply groove is formed in the sliding surface of at least one of said first clutch plate and the second clutch plate.

18. The differential gear as claimed in claim 17,
wherein a plurality of said oil reservoir holes are formed at a set interval in a peripheral direction of the first clutch plate, and a radial direction position of the first clutch plate is changed in an adjacent oil reservoir holes.

19. The differential gear as claimed in claim 1,
which comprises a lubricating oil supplying means for supplying a lubricating oil within the case to a portion between sliding surfaces of both the clutch plates from a fitted portion between said side gear and the clutch plate.

20. The differential gear as claimed in claim 1,
wherein a diameter of said main communication in the gear teeth of the side gear is smaller than a diameter of the main communication path at an opposite end of the side gear.

21. A limited-slip differential gear assembly comprising a case, a pinion gear, and a side gear, the side gear including side gear teeth engaging pinion gear teeth of the pinion gear, the side gear engaging an inner pawl of a first clutch plate integrally rotating with the side gear, and the case engaging an outer pawl of a second clutch plate integrally rotating with the case,
the side gear comprising a lubricating oil communication path, the path including a first opening among the side gear teeth and a second opening along a portion of the side gear engaging the inner pawl of the first clutch plate,
whereby the side gear supplies lubricating oil within the case from the side gear teeth to clutch plates when rotating in mesh with the pinion gear.

* * * * *